(12) United States Patent
Fadell et al.

(10) Patent No.: US 9,715,239 B2
(45) Date of Patent: *Jul. 25, 2017

(54) COMPUTATIONAL LOAD DISTRIBUTION IN AN ENVIRONMENT HAVING MULTIPLE SENSING MICROSYSTEMS

(71) Applicant: Google Inc., Mountain View, CA (US)

(72) Inventors: Anthony Michael Fadell, Portola Valley, CA (US); Yoky Matsuoka, Los Altos Hills, CA (US); Matthew Rogers, Los Gatos, CA (US); David Sloo, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 14/548,131

(22) Filed: Nov. 19, 2014

(65) Prior Publication Data

US 2015/0081109 A1 Mar. 19, 2015

Related U.S. Application Data

(63) Continuation of application No. 13/891,335, filed on May 10, 2013, now Pat. No. 8,924,027, which is a
(Continued)

(51) Int. Cl.
*F24F 11/00* (2006.01)
*H04W 4/00* (2009.01)
(Continued)

(52) U.S. Cl.
CPC ......... *G05D 23/19* (2013.01); *B01D 46/0086* (2013.01); *F24D 19/10* (2013.01);
(Continued)

(58) Field of Classification Search
CPC .... F24F 11/0086; F24F 11/02; F24F 11/0034; F24F 11/006; F24F 11/001;
(Continued)

(56) References Cited

U.S. PATENT DOCUMENTS

| 4,223,831 A | 9/1980 | Szarka |
| 4,335,847 A | 6/1982 | Levine |

(Continued)

FOREIGN PATENT DOCUMENTS

| CA | 2202008 C | 2/2000 |
| EP | 196069 B1 | 12/1991 |

(Continued)

OTHER PUBLICATIONS

Aprilaire Electronic Thermostats Model 8355 User's Manual, Research Products Corporation, 2000, 16 pages.
(Continued)

*Primary Examiner* — Ramesh Patel
(74) *Attorney, Agent, or Firm* — Kilpatrick Townsend & Stockton LLP

(57) ABSTRACT

Systems, methods, and related computer program products for using a distributed arrangement of wirelessly connected sensing microsystems are described. A plurality of wirelessly communicating sensing microsystems is provided, each sensing microsystem including a temperature sensor and a processor. The plurality of sensing microsystems is configured to jointly carry out at least one shared computational task. Each sensing microsystem may include a power management circuit configured to determine an amount of electrical power available for dedication to the at least one shared computational task or a heating effect generated in performing the shared computational task. The at least one shared computational task is apportioned among respective ones of the plurality of sensing microsystems according to the amount of electrical power determined to be available for dedication thereto at each respective sensing microsystem or the determined heating effect.

20 Claims, 5 Drawing Sheets

Related U.S. Application Data continuation of application No. 13/038,206, filed on Mar. 1, 2011, now Pat. No. 8,478,447.

(60) Provisional application No. 61/429,093, filed on Dec. 31, 2010, provisional application No. 61/415,771, filed on Nov. 19, 2010.

(51) Int. Cl.

| | | |
|---|---|---|
| *G05D 23/19* | (2006.01) | |
| *F24D 19/10* | (2006.01) | |
| *B01D 46/00* | (2006.01) | |
| *G05B 15/02* | (2006.01) | |
| *F24F 11/02* | (2006.01) | |
| *H01R 9/24* | (2006.01) | |

(52) U.S. Cl.
CPC ........ *F24D 19/1084* (2013.01); *F24F 11/001* (2013.01); *F24F 11/006* (2013.01); *F24F 11/0009* (2013.01); *F24F 11/0012* (2013.01); *F24F 11/0034* (2013.01); *F24F 11/0086* (2013.01); *F24F 11/02* (2013.01); *G05B 15/02* (2013.01); *G05D 23/1902* (2013.01); *G05D 23/1917* (2013.01); *H01R 9/2416* (2013.01); *H04W 4/005* (2013.01); *F24F 2011/0047* (2013.01); *F24F 2011/0052* (2013.01); *F24F 2011/0053* (2013.01); *F24F 2011/0057* (2013.01); *F24F 2011/0061* (2013.01); *F24F 2011/0063* (2013.01); *F24F 2011/0068* (2013.01); *F24F 2011/0073* (2013.01); *F24F 2011/0075* (2013.01); *F24F 2011/0091* (2013.01); *F24F 2011/0093* (2013.01); *F24F 2011/0094* (2013.01); *Y02B 10/20* (2013.01); *Y02B 10/70* (2013.01); *Y02B 60/50* (2013.01); *Y10T 29/49826* (2015.01)

(58) Field of Classification Search
CPC ............... F24F 11/0009; F24F 11/0012; F24F 2011/0053; F24F 2011/0061; F24F 2011/0063; F24F 2011/0057; F24F 2011/0047; F24F 2011/0094; F24F 2011/0075; F24F 2011/0091; F24F 2011/0052; F24F 2011/0093; F24F 2011/0073; G05B 15/02; B01D 46/0086; H04W 4/005; F24D 19/1084; F24D 19/10; G05D 23/19; G05D 23/1917; G05D 23/1902; Y02B 60/50; Y02B 10/70; Y02B 10/20; Y10T 29/49826
See application file for complete search history.

(56) References Cited

U.S. PATENT DOCUMENTS

| | | | |
|---|---|---|---|
| 4,408,711 A | 10/1983 | Levine | |
| 4,528,459 A | 7/1985 | Wiegel | |
| 4,615,380 A | 10/1986 | Beckey | |
| 4,646,964 A | 3/1987 | Parker et al. | |
| 4,656,835 A | 4/1987 | Kidder et al. | |
| 4,657,179 A | 4/1987 | Aggers et al. | |
| 4,674,027 A | 6/1987 | Beckey | |
| 4,685,614 A | 8/1987 | Levine | |
| 4,742,475 A | 5/1988 | Kaiser et al. | |
| 4,751,961 A | 6/1988 | Levine et al. | |
| 4,898,229 A | 2/1990 | Brown et al. | |
| 4,948,040 A | 8/1990 | Kobayashi et al. | |
| 5,088,645 A | 2/1992 | Bell | |
| 5,107,918 A | 4/1992 | McFarlane et al. | |
| 5,211,332 A | 5/1993 | Adams | |
| 5,224,648 A * | 7/1993 | Simon | F24F 11/00 165/259 |
| 5,240,178 A | 8/1993 | Dewolf et al. | |
| 5,251,813 A | 10/1993 | Kniepkamp | |
| 5,341,988 A * | 8/1994 | Rein | G05D 23/1934 236/49.3 |
| 5,348,078 A | 9/1994 | Dushane et al. | |
| 5,381,950 A | 1/1995 | Aldridge | |
| 5,395,042 A * | 3/1995 | Riley | F24F 11/0009 165/237 |
| 5,422,808 A | 6/1995 | Catanese, Jr. et al. | |
| 5,452,762 A | 9/1995 | Zillner, Jr. | |
| 5,456,407 A | 10/1995 | Stalsberg et al. | |
| 5,460,327 A | 10/1995 | Hill et al. | |
| 5,462,225 A | 10/1995 | Massara et al. | |
| 5,467,921 A | 11/1995 | Shreeve et al. | |
| 5,476,221 A | 12/1995 | Seymour | |
| 5,499,196 A | 3/1996 | Pacheco | |
| 5,533,668 A | 7/1996 | Erikson | |
| 5,544,036 A | 8/1996 | Brown, Jr. et al. | |
| 5,555,927 A | 9/1996 | Shah | |
| 5,570,837 A | 11/1996 | Brown et al. | |
| 5,595,342 A | 1/1997 | McNair et al. | |
| 5,611,484 A | 3/1997 | Uhrich | |
| 5,635,896 A | 6/1997 | Tinsley et al. | |
| 5,644,173 A | 7/1997 | Elliason et al. | |
| 5,646,349 A | 7/1997 | Twigg et al. | |
| 5,655,709 A | 8/1997 | Garnett et al. | |
| 5,761,083 A | 6/1998 | Brown, Jr. et al. | |
| 5,785,244 A * | 7/1998 | McBroom | B60H 1/00842 137/624.2 |
| 5,801,940 A * | 9/1998 | Russ | G01D 4/004 700/276 |
| 5,802,467 A | 9/1998 | Salazar et al. | |
| 5,839,654 A | 11/1998 | Weber | |
| 5,902,099 A * | 5/1999 | Rowlette | F23N 5/123 126/116 A |
| 5,902,183 A | 5/1999 | D'Souza | |
| 5,909,378 A | 6/1999 | De Milleville | |
| 5,926,776 A | 7/1999 | Glorioso et al. | |
| 5,971,597 A * | 10/1999 | Baldwin | G01K 1/16 340/540 |
| 5,977,964 A | 11/1999 | Williams et al. | |
| 6,062,482 A | 5/2000 | Gauthier et al. | |
| 6,089,310 A | 7/2000 | Toth et al. | |
| 6,098,893 A | 8/2000 | Berglund et al. | |
| 6,116,512 A | 9/2000 | Dushane et al. | |
| 6,213,404 B1 | 4/2001 | Dushane et al. | |
| 6,216,956 B1 | 4/2001 | Ehlers et al. | |
| 6,234,398 B1 * | 5/2001 | Pawlak, III | B60H 1/00735 236/91 C |
| 6,315,211 B1 | 11/2001 | Sartain et al. | |
| 6,349,883 B1 | 2/2002 | Simmons et al. | |
| 6,356,038 B2 | 3/2002 | Bishel | |
| 6,356,204 B1 | 3/2002 | Guindi et al. | |
| 6,385,510 B1 | 5/2002 | Hoog et al. | |
| 6,453,687 B2 | 9/2002 | Sharood et al. | |
| 6,513,723 B1 | 2/2003 | Mueller et al. | |
| 6,519,509 B1 | 2/2003 | Nierlich et al. | |
| 6,549,870 B2 | 4/2003 | Proffitt et al. | |
| 6,574,581 B1 | 6/2003 | Bohrer et al. | |
| 6,604,023 B1 | 8/2003 | Brown et al. | |
| 6,619,055 B1 | 9/2003 | Addy | |
| 6,619,555 B2 | 9/2003 | Rosen | |
| 6,622,115 B1 | 9/2003 | Brown et al. | |
| 6,622,925 B2 | 9/2003 | Carner et al. | |
| 6,645,066 B2 | 11/2003 | Gutta et al. | |
| 6,769,482 B2 | 8/2004 | Wagner et al. | |
| 6,798,341 B1 | 9/2004 | Eckel et al. | |
| 6,851,621 B1 | 2/2005 | Wacker et al. | |
| 6,891,838 B1 | 5/2005 | Petite et al. | |
| 6,909,921 B1 | 6/2005 | Bilger | |
| 6,956,463 B2 | 10/2005 | Crenella et al. | |
| 6,975,958 B2 | 12/2005 | Bohrer et al. | |
| 6,983,889 B2 | 1/2006 | Alles | |
| 6,997,390 B2 | 2/2006 | Alles | |
| 7,024,336 B2 | 4/2006 | Salsbury et al. | |
| 7,055,759 B2 | 6/2006 | Wacker et al. | |
| 7,135,965 B2 | 11/2006 | Chapman, Jr. et al. | |
| 7,156,316 B2 | 1/2007 | Kates | |
| 7,168,627 B2 | 1/2007 | Kates | |

(56) References Cited

U.S. PATENT DOCUMENTS

| | | |
|---|---|---|
| 7,174,239 B2 | 2/2007 | Butler et al. |
| 7,289,887 B2 | 10/2007 | Rodgers |
| 7,360,370 B2 | 4/2008 | Shah et al. |
| RE40,437 E | 7/2008 | Rosen |
| 7,434,742 B2 | 10/2008 | Mueller et al. |
| 7,460,690 B2 | 12/2008 | Cohen et al. |
| 7,469,550 B2 | 12/2008 | Chapman, Jr. et al. |
| 7,476,988 B2 | 1/2009 | Mulhouse et al. |
| 7,510,126 B2 | 3/2009 | Rossi et al. |
| 7,537,171 B2 | 5/2009 | Mueller et al. |
| 7,558,648 B2 | 7/2009 | Hoglund et al. |
| 7,571,865 B2 | 8/2009 | Nicodem et al. |
| 7,575,179 B2 | 8/2009 | Morrow et al. |
| 7,605,714 B2 | 10/2009 | Thompson et al. |
| 7,644,869 B2 | 1/2010 | Hoglund et al. |
| 7,648,077 B2 | 1/2010 | Rossi et al. |
| 7,673,809 B2 | 3/2010 | Juntunen |
| 7,702,424 B2 | 4/2010 | Cannon et al. |
| 7,703,694 B2 | 4/2010 | Mueller et al. |
| D614,976 S | 5/2010 | Skafdrup et al. |
| 7,748,640 B2 | 7/2010 | Roher et al. |
| 7,775,452 B2 | 8/2010 | Shah et al. |
| 7,780,092 B2 * | 8/2010 | Ahmed ............... F24F 11/001 165/212 |
| 7,784,704 B2 | 8/2010 | Harter |
| 7,801,646 B2 | 9/2010 | Amundson et al. |
| 7,802,618 B2 | 9/2010 | Simon et al. |
| 7,832,465 B2 | 11/2010 | Zou et al. |
| 7,837,128 B2 | 11/2010 | Helt et al. |
| 7,841,542 B1 | 11/2010 | Rosen |
| 7,847,681 B2 | 12/2010 | Singhal et al. |
| 7,848,900 B2 | 12/2010 | Steinberg et al. |
| 7,854,389 B2 * | 12/2010 | Ahmed ............... F24F 11/0008 236/44 C |
| 7,900,849 B2 | 3/2011 | Barton et al. |
| 7,904,209 B2 | 3/2011 | Podgorny et al. |
| 7,904,830 B2 | 3/2011 | Hoglund et al. |
| 7,948,189 B2 * | 5/2011 | Ahmed ............... H05B 37/0218 315/291 |
| 8,010,237 B2 | 8/2011 | Cheung et al. |
| 8,019,567 B2 | 9/2011 | Steinberg et al. |
| 8,090,477 B1 | 1/2012 | Steinberg |
| 8,131,497 B2 | 3/2012 | Steinberg et al. |
| 8,180,492 B2 | 5/2012 | Steinberg |
| 8,185,245 B2 | 5/2012 | Amundson et al. |
| 8,195,313 B1 | 6/2012 | Fadell et al. |
| 8,280,536 B1 | 10/2012 | Fadell et al. |
| 8,478,447 B2 * | 7/2013 | Fadell ............... F24F 11/0012 165/200 |
| 8,924,027 B2 * | 12/2014 | Fadell ............... F24F 11/0012 165/201 |
| 2003/0231001 A1 | 12/2003 | Bruning |
| 2004/0249479 A1 | 12/2004 | Shorrock |
| 2005/0043907 A1 | 2/2005 | Eckel et al. |
| 2005/0128067 A1 | 6/2005 | Zakrewski |
| 2005/0189429 A1 | 9/2005 | Breeden |
| 2005/0194455 A1 | 9/2005 | Alles |
| 2005/0194456 A1 | 9/2005 | Tessier et al. |
| 2005/0270151 A1 | 12/2005 | Winick |
| 2005/0280421 A1 | 12/2005 | Yomoda et al. |
| 2006/0105697 A1 | 5/2006 | Aronstam et al. |
| 2006/0149395 A1 | 7/2006 | Archacki et al. |
| 2006/0186214 A1 | 8/2006 | Simon et al. |
| 2006/0196953 A1 | 9/2006 | Simon et al. |
| 2006/0208099 A1 | 9/2006 | Chapman et al. |
| 2007/0045432 A1 | 3/2007 | Juntunen |
| 2007/0067063 A1 * | 3/2007 | Ahmed ............... F24F 11/001 700/275 |
| 2007/0083660 A1 * | 4/2007 | Thornton ............... G06F 9/4445 709/201 |
| 2007/0084937 A1 * | 4/2007 | Ahmed ............... F24F 11/0008 236/44 C |
| 2007/0114295 A1 | 5/2007 | Jenkins |
| 2007/0131787 A1 | 6/2007 | Rossi et al. |
| 2007/0228183 A1 | 10/2007 | Kennedy et al. |
| 2007/0241203 A1 | 10/2007 | Wagner et al. |
| 2008/0015740 A1 | 1/2008 | Osann |
| 2008/0015742 A1 | 1/2008 | Kulyk et al. |
| 2008/0054082 A1 | 3/2008 | Evans et al. |
| 2008/0094010 A1 | 4/2008 | Black |
| 2008/0099568 A1 | 5/2008 | Nicodem et al. |
| 2008/0128523 A1 | 6/2008 | Hoglund et al. |
| 2008/0161977 A1 | 7/2008 | Takach et al. |
| 2008/0185450 A1 | 8/2008 | Kwon et al. |
| 2008/0191045 A1 | 8/2008 | Harter |
| 2008/0273754 A1 | 11/2008 | Hick et al. |
| 2008/0317292 A1 | 12/2008 | Baker et al. |
| 2009/0045263 A1 | 2/2009 | Mueller et al. |
| 2009/0099697 A1 | 4/2009 | Li et al. |
| 2009/0140057 A1 | 6/2009 | Leen |
| 2009/0171862 A1 | 7/2009 | Harrod et al. |
| 2009/0194601 A1 | 8/2009 | Flohr |
| 2009/0236433 A1 | 9/2009 | Mueller et al. |
| 2009/0243842 A1 | 10/2009 | Mitchell et al. |
| 2009/0254225 A1 | 10/2009 | Boucher et al. |
| 2009/0259713 A1 | 10/2009 | Blumrich et al. |
| 2009/0261174 A1 | 10/2009 | Butler et al. |
| 2009/0297901 A1 | 12/2009 | Kilian et al. |
| 2010/0000239 A1 | 1/2010 | Lifson et al. |
| 2010/0006660 A1 | 1/2010 | Leen et al. |
| 2010/0019051 A1 | 1/2010 | Rosen |
| 2010/0025483 A1 * | 2/2010 | Hoeynck ............... F24F 11/001 236/1 C |
| 2010/0070084 A1 * | 3/2010 | Steinberg ............... F24F 11/006 700/276 |
| 2010/0070086 A1 * | 3/2010 | Harrod ............... F24F 11/0086 700/276 |
| 2010/0070099 A1 | 3/2010 | Watson et al. |
| 2010/0070234 A1 | 3/2010 | Steinberg et al. |
| 2010/0084482 A1 | 4/2010 | Kennedy et al. |
| 2010/0163633 A1 | 7/2010 | Barrett et al. |
| 2010/0167783 A1 | 7/2010 | Alameh et al. |
| 2010/0168924 A1 | 7/2010 | Tessier et al. |
| 2010/0182743 A1 | 7/2010 | Roher |
| 2010/0193592 A1 | 8/2010 | Simon et al. |
| 2010/0211224 A1 | 8/2010 | Keeling et al. |
| 2010/0250009 A1 | 9/2010 | Lifson et al. |
| 2010/0261465 A1 | 10/2010 | Rhoads et al. |
| 2010/0262298 A1 * | 10/2010 | Johnson ............... F24F 11/001 700/277 |
| 2010/0262299 A1 | 10/2010 | Cheung et al. |
| 2010/0280667 A1 | 11/2010 | Steinberg |
| 2010/0289643 A1 * | 11/2010 | Trundle ............... F24F 11/0086 340/545.1 |
| 2010/0305771 A1 | 12/2010 | Rodgers |
| 2010/0308119 A1 | 12/2010 | Steinberg et al. |
| 2010/0318227 A1 | 12/2010 | Steinberg et al. |
| 2011/0001812 A1 | 1/2011 | Kang et al. |
| 2011/0046792 A1 | 2/2011 | Imes et al. |
| 2011/0046805 A1 | 2/2011 | Bedros et al. |
| 2011/0046806 A1 * | 2/2011 | Nagel ............... H04L 67/125 700/291 |
| 2011/0054699 A1 | 3/2011 | Imes et al. |
| 2011/0077758 A1 | 3/2011 | Tran et al. |
| 2011/0077896 A1 | 3/2011 | Steinberg et al. |
| 2011/0185895 A1 | 8/2011 | Freen |
| 2011/0253796 A1 | 10/2011 | Posa et al. |
| 2011/0307103 A1 | 12/2011 | Cheung et al. |
| 2012/0065935 A1 | 3/2012 | Steinberg et al. |
| 2012/0085831 A1 | 4/2012 | Kopp |
| 2012/0126019 A1 | 5/2012 | Warren et al. |
| 2012/0126020 A1 * | 5/2012 | Filson ............... F24F 11/0012 236/1 C |
| 2012/0130547 A1 | 5/2012 | Fadell et al. |
| 2012/0130548 A1 * | 5/2012 | Fadell ............... F24F 11/0012 700/278 |
| 2012/0158350 A1 | 6/2012 | Steinberg et al. |
| 2012/0221151 A1 | 8/2012 | Steinberg |

(56) References Cited

U.S. PATENT DOCUMENTS

| | | |
|---|---|---|
| 2012/0239207 A1 | 9/2012 | Fadell et al. |
| 2012/0248211 A1 | 10/2012 | Warren et al. |
| 2013/0325190 A1* | 12/2013 | Imes .................... F24F 11/0012 700/276 |

FOREIGN PATENT DOCUMENTS

| | | |
|---|---|---|
| EP | 510807 A2 | 10/1992 |
| EP | 660287 A1 | 6/1995 |
| EP | 690363 A2 | 1/1996 |
| EP | 1275037 B1 | 2/2006 |
| EP | 2302326 A1 | 3/2011 |
| JP | 59106311 A | 6/1984 |
| JP | 01252850 A | 10/1989 |
| JP | 09298780 A | 11/1997 |
| JP | 10023565 A | 1/1998 |
| WO | 2006012158 | 2/2006 |
| WO | 2008054938 A2 | 5/2008 |

OTHER PUBLICATIONS

Braeburn 5300 Installer Guide, Braeburn Systems, LLC, 2009, 10 pages.
Braeburn Model 5200, Braeburn Systems, LLC, 2011, 11 pages.
Ecobee Smart Si Thermostat Installation Manual, Ecobee, 2012, 40 pages.
Ecobee Smart Si Thermostat User Manual, Ecobee, 2012, 44 pages.
Ecobee Smart Thermostat Installation Manual, 2011, 20 pages.
Ecobee Smart Thermostat User Manual, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., 2012, 24 pages.
Honeywell Operating Manual FocusPRO TH6000 Series, Honeywell International, Inc., 2011, 80 pages.
Honeywell Prestige IAQ Product Data 2, Honeywell International, Inc., 2012, 126 pages.
Honeywell Prestige THX9321 and TXH9421 Product Data, Honeywell International, Inc., 68-0311, No Date Given, 126 pages.
Honeywell Prestige THX9321-9421 Operating Manual, Honeywell International, Inc., 2011, 120 pages.
Hunter Internet Thermostat Installation Guide, Hunter Fan Co., 2012, 8 pages.
Introducing the New Smart Si Thermostat, Datasheet [online]. Ecobee, No Date Given [retrieved on Feb. 25, 2013]. Retrieved from the Internet: <URL: https://www.ecobee.com/solutions/home/smart-si/>.
Lennox ComfortSense 5000 Owner's Guide, Lennox Industries, Inc., 2007, 32 pages.
Lennox ComfortSense 7000 Owner's Guide, Lennox Industries, Inc., 2009, 15 pages.
Lennox iComfort Manual, Lennox Industries, Inc., 2010, 20 pages.
Lux PSPU732T Manual, LUX Products Corporation, Jan. 6, 2009, 48 pages.
NetX RP32—WI FI Network Thermostat Consumer Brochure, Network Thermostat, May 2011, 2 pages.
NetX RP32—WIFI Network Thermostat Specification Sheet, Network Thermostat, 2012, 2 pages.
RobertShaw Product Manual 9620, Maple Chase Company, 2001, 14 pages.
RobertShaw Product Manual 9825i2, Maple Chase Company, 2006, 36 pages.
SYSTXCCUIZ01-V Infinity Control Installation Instructions, Carrier Corp, 2012, 20 pages.
T8611G Chronotherm Iv Deluxe Programmable Heat Pump Thermostat Product Data, Honeywell International Inc., 1997, 24 pages.
TB-PAC, TB-PHP, Base Series Programmable Thermostats, Carrier Corp, 2012, 8 pages.
The Perfect Climate Comfort Center PC8900A W8900A-C Product Data Sheet, Honeywell International Inc, 2001, 44 pages.
Trane Communicating Thermostats for Fan Coil, Trane, 2011, 32 pages.
Trane Communicating Thermostats for Heat Pump Control, Trane, 2011, 32 pages.
Trane Install XL600 Installation Manual, Trane, 2006, 16 pages.
Trane XL950 Installation Guide, Trane, 2011, 20 pages.
Venstar T2900 Manual, Venstar, Inc., 2008, 113 pages.
Venstar 15800 Manual, Venstar, Inc., Sep. 7, 2011, 63 pages.
VisionPRO TH8000 Series Installation Guide, Honeywell International, Inc., 2012, 12 pages.
VisionPRO TH8000 Series Operating Manual, Honeywell International, Inc., 2012, 96 pages.
VisionPRO Wi-Fi Programmable Thermostat, Honeywell International, Inc. Operating Manual, 2012, 48 pages.
White Rodgers (Emerson) Modei1F81-261 Installation and Operating Instructions, White Rodgers, Apr. 15, 2010,8 pages.
White Rodgers (Emerson) ModeiiF98EZ-1621 Homeowner's User Guide, White Rodgers, Jan. 25, 2012, 28 pages.
Allen et al., "Real-Time Earthquake Detection and Hazard Assessment by ElarmS Across California", Geophysical Research Letters, vol. 36, L00B08, 2009, pp. 1-6.
Arens et al., "Demand Response Enabling Technology Development", Phase I Report: Jun. 2003-Nov. 2005, Jul. 27, P:/Demand Res/UC Papers/DR-Phase1Report-Final DraftApril24-26.doc, University of California Berkeley, pp. 1-108.
Arens et al., "New Thermostat Demand Response Enabling Technology", Poster, University of California Berkeley, Jun. 10, 2004.
Bourke, "Server Load Balancing", O'Reilly & Associates, Inc., Aug. 2001, 182 pages.
Deleeuw, "Ecobee WiFi Enabled Smart Thermostat Part 2: The Features Review", Retrieved from <URL: http://www.homenetworkenabled.com/content.php?136-ecobee-WiFi-enabled-Smart-Thermostat-Part-2-The-Features-review>, Dec. 2, 2011, 5 pages.
Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.
Loisos et al., "Buildings End-Use Energy Efficiency: Alternatives to Compressor Cooling", California Energy Commision, Public Interest Energy Research, Jan. 2000, 80 pages.
Lu et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.
Mozer, "The Neural Network House: An Environmental that Adapts to its Inhabitants", AAAI Technical Report SS-98-02, 1998, pp. 110-114.
White et al., "A Conceptual Model for Simulation Load Balancing", Proc. 1998 Spring Simulation Interoperability Workshop, 1998, 7 pages.

* cited by examiner

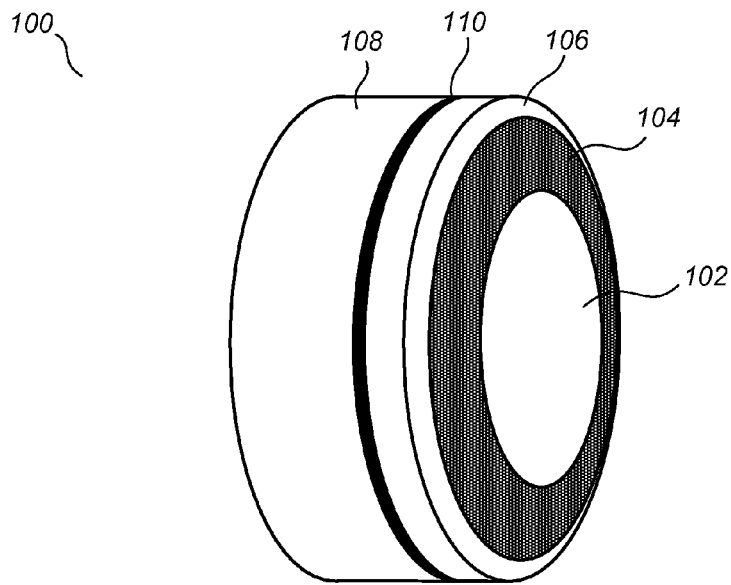
FIG. 1A
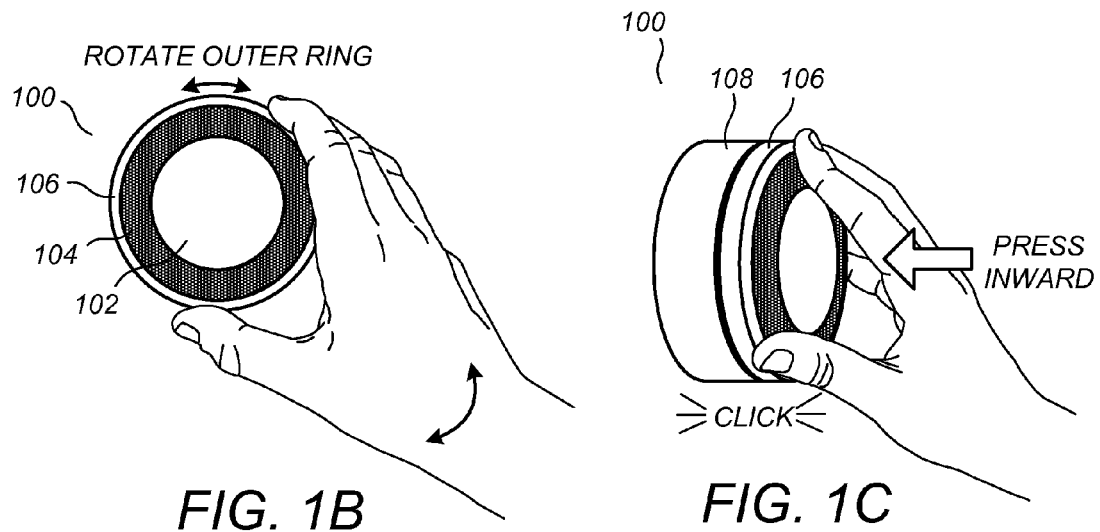
FIG. 1B
FIG. 1C

COMPUTATIONAL LOAD DISTRIBUTION IN AN ENVIRONMENT HAVING MULTIPLE SENSING MICROSYSTEMS

CROSS-REFERENCE TO RELATED APPLICATIONS

The present application is a continuation application of U.S. application Ser. No. 13/891,335 filed on May 10, 2013, which is a continuation application of U.S. application Ser. No. 13/038,206 filed on Mar. 1, 2011, issued U.S. Pat. No. 8,478,447, which claims the benefit of U.S. Prov. Ser. No. 61/429,093 filed Dec. 31, 2010 and U.S. Prov. Ser. No. 61/415,771 filed Nov. 19, 2010, each of which is incorporated by reference herein. The subject matter of this provisional patent specification relates to the subject matter of the following commonly assigned applications: U.S. Ser. No. 12/881,430 filed Sep. 14, 2010; U.S. Ser. No. 12/881,463 filed Sep. 14, 2010; U.S. Ser. No. 12/987,257 filed Jan. 10, 2011; U.S. Ser. No. 13/034,666 filed Feb. 24, 2011; U.S. Ser. No. 13/034,674 filed Feb. 24, 2011; and U.S. Ser. No. 13/034,678 filed Feb. 24, 2011. Each of the above-referenced patent applications is incorporated by reference herein. The above-referenced patent applications are collectively referenced hereinbelow as "the commonly assigned incorporated applications."

FIELD

This patent specification relates to system monitoring and control, such as to the monitoring and control of heating, cooling, and air conditioning (HVAC) systems. More particularly, this patent specification relates to systems, methods, and related computer program products for controlling one or more systems, such as HVAC systems, using a distributed arrangement of wirelessly connected sensing and control units.

BACKGROUND AND SUMMARY

Substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

For the purposes of controlling one or more HVAC systems for climate control in an enclosure, systems for that incorporate a distributed array of wirelessly communicating sensing units are known in art and discussed, for example, in U.S. Pat. No. 5,395,042, which is incorporated by reference herein. Different methods for powering the wirelessly communicating sensing units are also known in the art, including using standard building AC outlet power as discussed in US20080015740A1, standard battery-only power as discussed in US20070114295A1, and solar-charged battery power as discussed U.S. Pat. No. 5,395,042, supra. For wirelessly communicating thermostatic sensing units having control wires running directly to a conventional HVAC system, so-called "power stealing" or "parasitic powering" methods such as those discussed in U.S. Pat. No. 7,510,126 can be used, wherein a relatively small amount of power is extracted from a call relay coil voltage provided by the HVAC system. Each of the above-cited patents and patent publications is incorporated by reference herein.

For the purposes of controlling one or more HVAC systems for climate control in an enclosure, various computational methods have been proposed for optimizing the control of one or more HVAC systems in a manner that accommodates a balance of human comfort and energy efficiency, the optimizing being based at least in part on current and historical environmental readings and inputs acquired at a distributed network of sensing nodes. Examples of such proposals are discussed in U.S. Pat. No. 7,847,681B2 and US20100262298A1, each of which is incorporated by reference herein. Generally speaking, such computational methods can involve multidimensional feedback control system characterization or "learning" of a climate control environment having one or more HVAC systems and/or simultaneous optimization of plural multidimensional feedback control system performance metrics (such as a "total suffering" metric described in US20100262298A1, supra) based on learned or known multidimensional feedback control system parameters and constraints characteristic of the climate control environment. Such computational tasks, which are termed "characterization and/or optimization algorithms" hereinbelow for clarity of description and not by way of limitation, can be of relatively high computational complexity and therefore can represent a relatively high computational load.

Provided according to an embodiment is a climate control system comprising a plurality of wirelessly communicating sensing microsystems, each sensing microsystem including a temperature sensor and a processor, at least one of the sensing microsystems being coupled to an HVAC unit for control thereof. The plurality of sensing microsystems is configured to jointly carry out at least one shared computational task associated with the control of the HVAC unit. Each sensing microsystem includes a power management circuit configured to determine an amount of electrical power available for dedication to the at least one shared computational task. The at least one shared computational task is apportioned among respective ones of the plurality of sensing microsystems according to the amount of electrical power determined to be available for dedication thereto at each respective sensing microsystem.

BRIEF DESCRIPTION OF THE DRAWINGS

FIGS. 1A-1C illustrate external views of a sensing microsystem according to an embodiment;

DETAILED DESCRIPTION

Figure 2A:
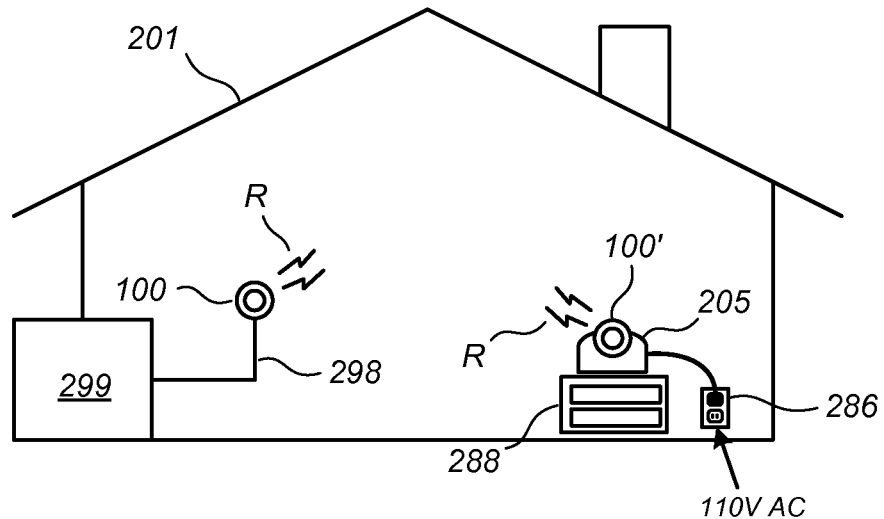
FIG. 2A illustrates a building enclosure including plural sensing microsystems and an HVAC system according to an embodiment.

One or more of the embodiments described herein is particularly advantageous for use with climate control systems having plural wirelessly communicating sensing microsystems, such as those described in one or more of the commonly assigned incorporated applications, supra. More particularly, one or more of the embodiments described herein is particularly advantageous in the practical implementation of an easy-to-install, easy-to-administer, flexible, and scalable network of smart, visually appealing, "lightweight" sensing and control nodes, referenced herein as sensing microsystems, that cooperate to govern the operation of one or more HVAC systems in a manner that promotes an optimal balance of human comfort and energy efficiency for an enclosure, such as a residential or business building enclosure. By "lightweight," it is meant that that the sensing microsystems are relatively compact and low-powered devices, comparable in size to handheld devices such as smartphones, and consuming relatively low amounts of electrical power, such as 10 watts or less. Lightweight computing devices, as that term is used herein, can be contrasted with computing devices having relatively heavy power usage, such as desktop computers whose average energy usage is often in the hundred as watts, and such as laptop or notebook computers whose average energy usage is generally well over 10 watts, and rarely under 20 watts. It is to be appreciated that while the above numerical examples provide a fair characterization of a "lightweight" computing device by current technological standards, one skilled in the art would be readily aware that a lesser dividing line, such as 1 watt or less of average energy usage, may provide a fair characterization of what is meant by a lightweight computing device as more energy-efficient microprocessor technologies are hereinafter developed.

It is to be appreciated that while one or more embodiments is detailed herein for the context of a residential home, such as a single-family house, the scope of the present teachings is not so limited, the present teachings being likewise applicable, without limitation, to duplexes, townhomes, multi-unit apartment buildings, hotels, retail stores, office buildings, industrial buildings, and more generally any living space or work space having one or more HVAC systems. It is to be further appreciated that while the terms user, customer, installer, homeowner, occupant, guest, tenant, landlord, repair person, and the like may be used to refer to the person or persons who are interacting with the sensing microsystem or other device or user interface in the context of some particularly advantageous situations described herein, these references are by no means to be considered as limiting the scope of the present teachings with respect to the person or persons who are performing such actions.

FIGS. 1A-1C illustrate external views of a sensing microsystem 100 for which shared computational load distribution in a climate control system having plural such sensing microsystems according to one or more embodiments is particularly suitable. For some embodiments, the sensing microsystem 100 corresponds to one or more of the intelligent, wirelessly communicating thermostatic units (termed in Ser. No. 61/429,093, supra, as a versatile sensing and control unit or VSCU) described in one or more of the commonly assigned incorporated applications, supra. As facilitated by its lightweight character, sensing microsystem 100 preferably has a sleek, elegant appearance that does not detract from home decoration, and indeed can serve as a visually pleasing centerpiece for the immediate location in which it is installed. The sensing microsystem 100 comprises a main body 108 that is preferably circular with a diameter of about 8 cm, and that has a visually pleasing outer finish, such as a satin nickel or chrome finish. Separated from the main body 108 by a small peripheral gap 110 is a cap-like structure comprising a rotatable outer ring 106, a sensor ring 104, and a circular display monitor 102. The outer ring 106 preferably has an outer finish identical to that of the main body 108, while the sensor ring 104 and circular display monitor 102 have a common circular glass (or plastic) outer covering that is gently arced in an outward direction and that provides a sleek yet solid and durable-looking overall appearance. The sensor ring 104 contains any of a wide variety of sensors including, without limitation, infrared sensors, visible-light sensors, and acoustic sensors. Preferably, the glass (or plastic) that covers the sensor ring 104 is smoked or mirrored such that the sensors themselves are not visible to the user. An air venting functionality is preferably provided, such as by virtue of the peripheral gap 110, which allows the ambient air to be sensed by an internal temperature sensor and any other internal sensors.

As discussed elsewhere in the commonly assigned incorporated applications, supra, for one embodiment the sensing microsystem 100 is controlled by only two types of user input, the first being a rotation of the outer ring 106 (FIG. 1B), and the second being an inward push on the outer ring 106 (FIG. 1C) until an audible and/or tactile "click" occurs. By virtue of user rotation of the outer ring 106 and the inward pushing of the outer ring 106 responsive to intuitive and easy-to-read prompts on the circular display monitor 102, the sensing microsystem 100 is advantageously capable of receiving all necessary information from the user for basic setup and operation.

FIG. 2A illustrates a plurality of wirelessly communicating sensing microsystems according to an embodiment, including a primary sensing microsystem 100 and an auxiliary sensing microsystem 100', as installed in a house 201 having an HVAC system 299 and a set of control wires 298 extending therefrom. The primary sensing microsystem 100 is connected to the HVAC system 299 by the control wires 298 for control thereof, while the auxiliary sensing microsystem 100' is disposed in a cradle or docking station 205 and placed, for example, on a nightstand 288 located in a bedroom of the house 201. As used herein, the term "primary sensing microsystem" refers to one that is electrically connected to actuate an HVAC system in whole or in part, which would necessarily include the first sensing microsystem purchased for any home, while the term "auxiliary sensing microsystem" or "remote sensing microsystem" refers to one or more additional sensing microsystems not electrically connected to actuate an HVAC system in whole or in part.

The primary sensing microsystem 100 and auxiliary sensing microsystem 100' are each configured to automatically recognize the presence of the other and to communicate with each other using a wireless communication protocol such as Wi-Fi, ZigBee, or Z-Wave, represented generically in FIG. 2A by the electromagnetic radiation signals R. The wireless communications among the multiple sensing microsystems can be achieved in a networked fashion using a home wireless router (not shown), on an ad hoc or peer-to-peer basis, various combinations thereof, or any other method that can be used to achieve wireless communication thereamong. In one example, the primary sensing microsystem 100 of FIG. 2A receives its electrical power by virtue of a power-stealing scheme, wherein a relatively small amount of power is extracted from a call relay coil voltage provided by the HVAC system. In one example, the auxiliary sensing microsystem 100' of FIG. 2A is powered from a building AC outlet 286, more particularly, by AC adapter circuitry (not shown) located in the docking station 205 and/or by an external "power brick" AC adapter (not shown) connected between docking station 205 and the wall outlet 286. In another examples, the primary sensing microsystem 100 of FIG. 2A receives its power from a common (C) HVAC signal wire provided by the HVAC system 299 as one of the control wires 298, while the auxiliary sensing microsystem 100' could be powered by standard alkaline or lithium batteries. As used herein, the term "continuous line power" refers to power that is provided by a generally continuous, reliable source such that, for normal everyday operational purposes, it can be assumed that such power will be ongoing and not drained or otherwise time-limited. For purposes of the instant disclosure, examples of continuous line power includes power provided from standard 110-volt AC wall outlets, and power provided by the common (C) wire of an HVAC system. Notably, not all HVAC systems provide a common (C) wire, thereby giving rise to a need for the above-described power-stealing schemes for some primary sensing microsystem installations. For purposes of the present disclosure, power sources such as stand-alone lithium or alkaline batteries, power-stealing arrangements (with or without associated rechargeable batteries), and rooftop- or window-mounted solar power sources (with or without associated rechargeable batteries) would represent examples of power sources that are not continuous line power sources.

Figure 2B:
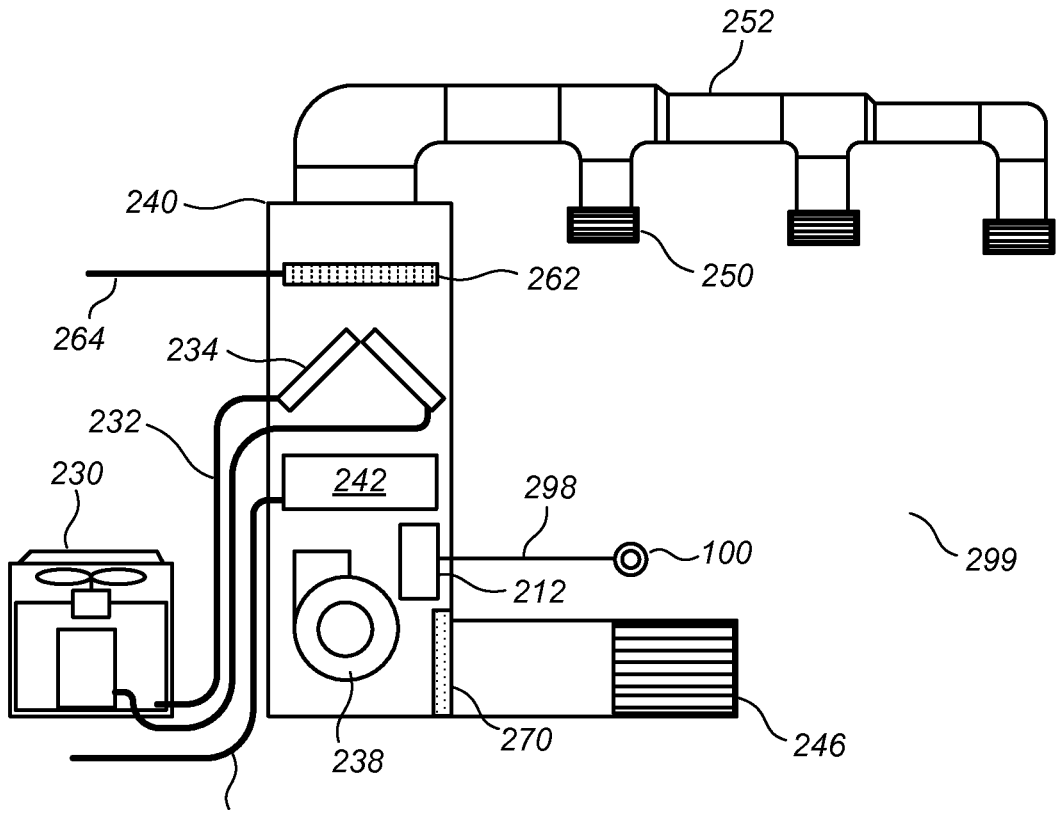
FIG. 2B illustrates a conceptual diagram of an HVAC system as wired to a sensing microsystem according to an embodiment.

FIG. 2B illustrates an exemplary diagram of the HVAC system 299 of FIG. 2A. HVAC system 299 provides heating, cooling, ventilation, and/or air handling for an enclosure, such as the single-family home 201 depicted in FIG. 2A. The HVAC system 299 depicts a forced air type heating system, although according to other embodiments, other types of systems could be used. In heating, heating coils or elements 242 within air handler 240 provide a source of heat using electricity or gas via line 236. Cool air is drawn from the enclosure via return air duct 246 through filter 270 using fan 238 and is heated by the heating coils or elements 242. The heated air flows back into the enclosure at one or more locations through a supply air duct system 252 and supply air grills such as grill 250. In cooling, an outside compressor 230 passes a gas such as Freon through a set of heat exchanger coils to cool the gas. The gas then goes via line 232 to the cooling coils 234 in the air handlers 240 where it expands, cools and cools the air being circulated through the enclosure via fan 238. According to some embodiments a humidifier 262 is also provided which moistens the air using water provided by a water line 264. Although not shown in FIG. 2B, according to some embodiments the HVAC system for the enclosure has other known components such as dedicated outside vents to pass air to and from the outside, one or more dampers to control airflow within the duct systems, an emergency heating unit, and a dehumidifier. The HVAC system is selectively actuated via control electronics 212 that communicate with the primary sensing microsystem 100 over control wires 298.

Figure 3A:
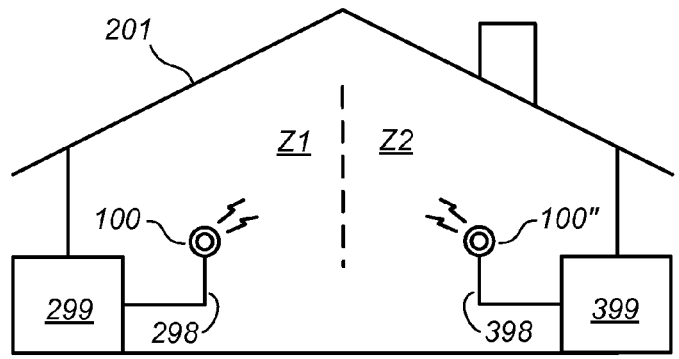
FIGS. 3A-3C illustrate examples of building enclosures including plural sensing microsystems and one or more HVAC systems according to one or more embodiments.
Figure 3B:
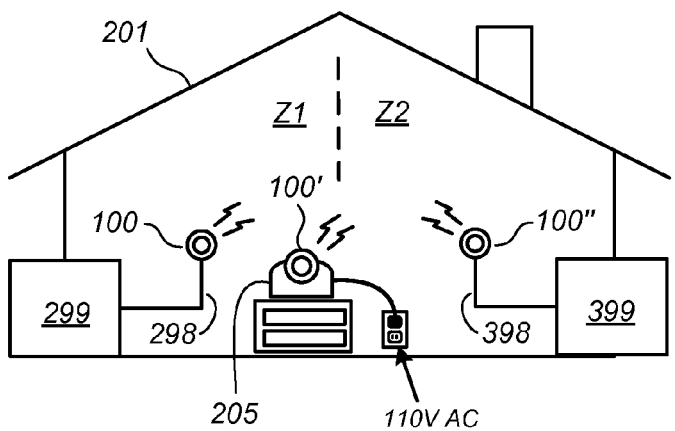
Figure 3C:
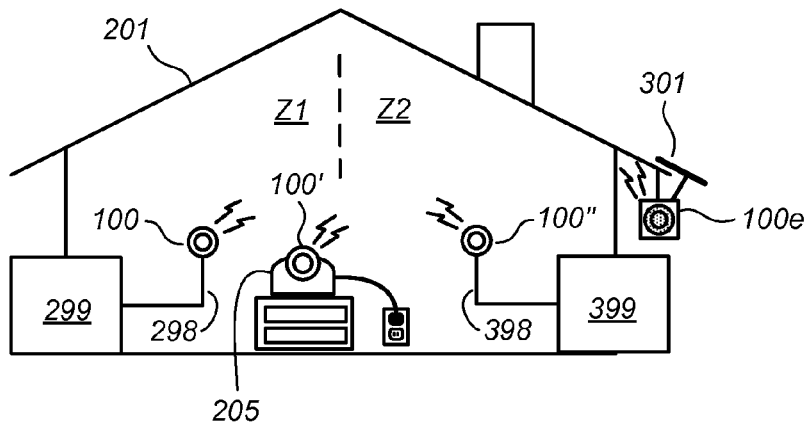

FIGS. 3A-3C illustrate examples of building enclosures including plural sensing microsystems and one or more HVAC systems according to one or more embodiments, and are set forth to illustrate but a few examples of the wide variety of different combinations of primary sensing microsystems, auxiliary sensing microsystems, and HVAC systems that can used in conjunction with one or more of the preferred embodiments. Thus, for example, in FIG. 3A the house 201 contains a second HVAC system 399 that is wired to a second primary sensing microsystem 100" over a set of control wires 398, the second primary sensing microsystem 100" being powered by a power-stealing scheme with HVAC system 399. The primary sensing microsystems 100 and 100" communicate with each other and cooperate with each other to provide an overall optimal control of the household climate.

Illustrated in FIG. 3B is the configuration of FIG. 3A with the addition of the auxiliary sensing microsystem 100' inserted into the docking station 205 that is powered by a building AC outlet. According to embodiments, an additional sensing microsystem, when docked or otherwise installed, will automatically detect and be detected by the existing sensing microsystems by wireless communication. The additional sensing microsystem will join in with the existing units to cooperate in unison for improved control heating and cooling control functionality. The additional information provided by virtue of the temperature sensing, occupancy sensing, etc. provided by the auxiliary sensing microsystem 100' further enhances the quality of overall HVAC system control with respect to user comfort and/or energy efficiency.

Illustrated in FIG. 3C is the configuration of FIG. 3B with the addition of a second auxiliary sensing microsystem 100e, which is powered from a solar cell 301 and optionally includes an internal battery that is recharged by the solar cell 301. The external temperature (and optionally other sensed data such as outdoor humidity, motion sensing, etc.) sensed by the auxiliary sensing microsystem 100e can be advantageously used to even further enhance the quality of overall HVAC system control with respect to user comfort and/or energy efficiency. Although not required, the sensing microsystem 100e can be made simpler than the sensing microsystems 100, 100', and 100" in that the user interface features can be omitted.

A variety of different docking station types and capabilities, and related interchangeabilities of primary and auxiliary sensing microsystems, are within the scope of the present teachings. For example, in one embodiment there is provided an HVAC-coupled docking station (not shown) that provides the required wiring connectivity to the HVAC unit and that optionally includes power-stealing circuitry. The various docking stations and sensing microsystems can be otherwise configured such that the different sensing microsystems can be interchanged into different docking stations, including an ability for a primary sensing microsystem to be placed into a nightstand docking station (thereby becoming an auxiliary sensing microsystem) and an ability for an auxiliary sensing microsystem to be placed into an HVAC-coupled docking station (thereby becoming a primary sensing microsystem).

For one embodiment, all sensing microsystems sold by the manufacturer can be identical in their core functionality, each being able to serve as either a primary sensing microsystem or auxiliary sensing microsystem as the case requires, although the different sensing microsystems may have different colors, ornamental designs, memory capacities, and so forth. For this embodiment, the user is advantageously able, if they desire, to interchange the positions of their sensing microsystems by simple removal of each one from its existing docking station and placement into a different docking station. Among other advantages, there is an environmentally, technically, and commercially appealing ability for the customer to upgrade to the newest, latest sensing microsystem designs and technologies without the need to throw away the existing sensing microsystem. For example, a customer with a single sensing microsystem (which is necessarily serving as a primary sensing microsystem) may be getting tired of its color or its TFT display, and may be attracted to a newly released sensing microsystem with a different color and a sleek new OLED display. For this case, in addition to buying the newly released sensing microsystem, the customer can buy a tabletop docking station to put on their nightstand. The customer can then insert their new sensing microsystem into the existing HVAC-coupled wall docking station, and then take their old sensing microsystem and insert it into the tabletop docking station. Advantageously, in addition to avoiding the wastefulness of discarding the old sensing microsystem, there is now a new auxiliary sensing microsystem at the bedside that not only provides increased comfort and convenience, but that also promotes increased energy efficiency by virtue of the additional multi-sensor information and processing power provided. For another embodiments, there can be a first class of sensing microsystems and associated docking stations that are specialized for use as primary sensing microsystems and interchangeable with each other, but not with a second class of sensing microsystems and associated docking stations that are specialized for use as auxiliary sensing microsystems, and which in turn are interchangeable with each other.

According to embodiments and as described in one or more of the commonly assigned incorporated applications, supra, a rich variety of capabilities is provided when one or more HVAC systems are controlled by one or more of the described sensing microsystems, with particularly advantageous operation being provided when plural sensing microsystems are used as in FIG. 2A and FIGS. 3A-3C. Although a particularly rich variety of capabilities is provided when the network of sensing microsystems is connected to the Internet, there is also a rich variety of capabilities provided even when there is no connection to the Internet. For scenarios in which there is no internet connectivity, the network of sensing microsystems is capable of performing tasks including, but not limited to: operating the one or more HVAC systems according to one or more heating/cooling schedules (template schedules) and sensed occupancies; providing a friendly user interface for easy modification of the template schedules and learning about user preferences and habits by question-and-answer; providing feedback on the user display regarding energy usage and usage patterns; "learning" about the preferences, habits, and occupancy patterns of the building occupants by virtue of sensor detection patterns, patterns of thermostatic control inputs, etc.; adapting to the learned preferences, habits, and occupancy patterns by static and/or dynamic modification to the template schedules; empirically modeling or otherwise characterizing the capabilities of the one or more HVAC systems and the thermal characteristics of the enclosure based on control inputs to the HVAC system(s) and distributed sensor data (as further facilitated by the outside weather sensing as facilitated by the externally positioned sensing microsystem 100e of FIG. 3C); and optimizing empirically and/or by system simulation the control of the one or more HVAC systems based on the determined thermal characteristics of the enclosure and/or the learned occupant preferences, habits, and occupancy patterns.

Further layers of advantageous functionality are provided for scenarios in which the sensing microsystems indeed have access to the Internet, the network of sensing microsystems being capable of performing tasks including, but not limited to: providing real time or aggregated home energy performance data to a utility company, a sensing microsystem data service provider, sensing microsystems in other homes, or other data destinations; receiving real time or aggregated home energy performance data from a utility company, sensing microsystem service provider, sensing microsystems in other homes, or other data sources; receiving new energy control algorithms or other software/firmware upgrades from one or more sensing microsystem service providers or other sources; receiving current and forecasted weather information for inclusion in energy-saving control algorithm processing; receiving user control commands from the user's computer, network-connected television, smart phone, or other stationary or portable data communication appliance (hereinafter collectively referenced as the user's "digital appliance"); providing an interactive user interface to the user through their digital appliance; receiving control commands and information from an external energy management advisor, such as a subscription-based service aimed at leveraging collected information from multiple sources to generate the best possible energy-saving control commands or profiles for their subscribers; receiving control commands and information from an external energy management authority, such as a utility company to whom limited authority has been voluntarily given to control the sensing microsystem in exchange for rebates or other cost incentives (e.g., for energy emergencies, "spare the air" days, etc.); providing alarms, alerts, or other information to the user on their digital appliance (and/or a user designee such as a home repair service) based on sensed HVAC-related events (e.g., the house is not heating up or cooling down as expected); providing alarms, alerts, or other information to the user on their digital appliance (and/or a user designee such as a home security service or the local police department) based on sensed non-HVAC related events (e.g., an intruder alert as sensed by the sensing microsystem's multi-sensor technology); and a variety of other useful functions enabled by network connectivity.

In view of the rich variety of capabilities provided by the network of sensing microsystems as described above, it has been found that a significant tension can arise between providing a network of easy-to-install, easy-to-administer, flexible, "lightweight" sensing microsystems, while at the same time providing advanced climate governance functionality that can require significant computing power. Thus, for example, according to one experiment reported in U.S. Pat. No. 7,510,126, supra, a "parasitic" or "power-stealing" circuit should draw no more than 55 milliwatts in order for most typical HVAC systems to remain unaffected. With reference to FIGS. 3A-3C, this can substantially limit the amount of computational load that can be carried out by the primary sensing microsystems 100 and 100" for installations in which they are powered by parasitic or power-stealing methods. Likewise, there may be substantial limits on the amount of incoming or battery-stored solar power available to the sensing microsystem 100e depending on the time of day, how sunny the weather is, and other factors. Notably, even for the auxiliary sensing microsystem 100' that derives its power from the AC wall outlet, that power level is not necessarily unlimited, but rather is limited by aesthetic design concerns, expense concerns, and heating concerns, including concerns about keeping the weight and bulkiness of "power brick" circuitry within tolerable levels at reasonable costs, and including concerns that relate to heat dissipation by the microprocessor circuitry.

Figure 4:
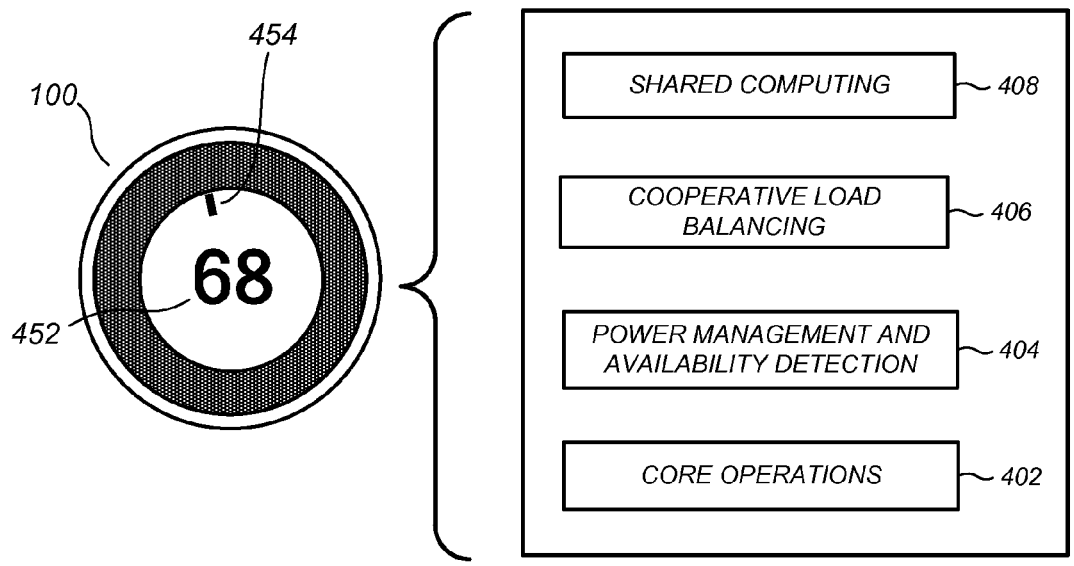
FIG. 4 illustrates a sensing microsystem and a conceptual functional block diagram thereof according to an embodiment.

FIG. 4 illustrates a sensing microsystem 100 and a conceptual functional block diagram thereof according to an embodiment. The sensing microsystem 100 of FIG. 4 can represent, without limitation, either a primary or auxiliary sensing microsystem. Sensing microsystem 100 comprises a core operations module 402, a power management and detection availability module 404, a cooperative load balancing module 406, and a shared computing module 408. The modules 402-408 may be implemented using any of a variety of different architectures without departing from the scope of the present teachings, ranging from a first example in which they are provided as separate electronic components in electrical and data communication with each other, to a second example in which they are provided as separate or integrated software routines for execution by a common microprocessor, and including any combination thereof.

The sensing microsystem 100 comprises physical hardware and firmware configurations, along with hardware, firmware, and software programming that is capable of carrying out the currently described methods. In view of the instant disclosure, a person skilled in the art would be able to realize the physical hardware and firmware configurations and the hardware, firmware, and software programming that embody the physical and functional features described herein without undue experimentation using publicly available hardware and firmware components and known programming tools and development platforms. By way of example, power sensing circuitry capable of determining an available amount of discretionary power, either on an instantaneous power availability basis (e.g., milliwatts) or an interval-based power availability basis (e.g., milliwatt-hours) based on incoming external power and/or stored power levels are known and commonly used in smartphone and other portable device technology. By way of further example, automated methods for computational load balancing, including both static methods (i.e., the shared computational task is distributed once among the different processing nodes and carried through to completion at each node) and dynamic methods (i.e., the shared computational task is re-distributed at selected intervals according to changing conditions) are known in the art and discussed generally, for example, in Bourke, *Server Load Balancing*, O'Reilly & Associates (2001), and White, et. al., "A Conceptual Model for Simulation Load Balancing," Proc. 1998 Spring Simulation Interoperability Workshop (1998), each of which is incorporated by reference herein.

According to an embodiment, core operations module 402 is configured to carry out the more basic tasks of the sensing microsystem 100 that would not generally be considered as candidates for load sharing, with examples including temperature sensing, occupancy sensing, providing a user interface for any walk-up users, and wireless data communications tasks that communicate associated basic information. For operation as a primary sensing microsystem, the core operations module 402 would further carry out comparisons of sensed temperatures to template schedules and sending appropriate actuation signals to the HVAC system to which it is coupled. In contrast, shared computing module 408 is configured to carry out the more advanced computational tasks whose promptness of execution would be substantially enhanced by load sharing among multiple nodes, such as the complex characterization and/or optimization algorithms discussed above.

System simulation algorithms represent one particular set of computational tasks that can benefit from load sharing. An example of an advantageous use of system simulation in a climate control environment would be to run a series of "what if" or "test cases" based on a model of the enclosure environment, which can be heavily recursive and therefore computationally intensive tasks which are relatively difficult for a single "lightweight" processor to achieve in a reasonable period of time. A variety of complex computations may also benefit from load sharing, including machine learning and mathematical optimization algorithms relating to system characterization, home occupancy prediction, set point optimization, and other computational goals, which can be carried out using one or more known technologies, models, and/or mathematical strategies including, but not limited to, artificial neural networks, Bayesian networks, genetic programming, inductive logic programming, support vector machines, decision tree learning, clustering analysis, dynamic programming, stochastic optimization, linear regression, quadratic regression, binomial regression, logistic regression, simulated annealing, and other learning, forecasting, and optimization techniques.

According to an embodiment, power management and availability detection module 404 is configured to determine an amount of electrical power available for dedication to the shared computational task that is carried out by shared computing module 408. For one embodiment, power management and availability detection module 404 is configured to (a) determine a total amount of electrical power available to the sensing microsystem 100, (b) determine the amount of electrical power required for the core operations of the sensing microsystem, those core operations including at least one temperature sensing task and at least one wireless communication task, and (c) determining the amount of electrical power that can be dedicated to the shared computing task (i.e., expended by shared computing module 408) based on the difference between the total available power and the required core operations power. For purposes of clarity of description and not by way of limitation, the amount of electrical power determined to be available for dedication to the shared computing task is referenced herein as "spare" electrical power.

According to an embodiment, cooperative load balancing module 406 is configured to cooperate with the other sensing microsystems to allocate the shared computational task thereamong according to the amount of "spare" power available at each of them, that is, the amount of power that is available to be dedicated to the shared computing task as determined by the power management and availability detection module 404. A variety of different strategies and relational architectures can be used for load balancing among the different sensing microsystems without departing from the scope of the present teachings. In one example, the load allocation decisions can be dictated solely by one of the primary sensing microsystems, such as the primary sensing microsystem connected to the HVAC unit in a single-HVAC system installation, based on information reported to it by the auxiliary sensing microsystems. To achieve this with a common code base applied across all of the sensing microsystems, each is programmed with a basic self-awareness module in which it is determined whether that module is a primary sensing microsystem or an auxiliary sensing microsystem. Software switches can then be programmed in such that a different load balancing module 406 is actuated depending on whether that unit is a primary or auxiliary sensing microsystem. The load balancing module 406 for the primary sensing microsystem would contain the "master" load-balancing routine that allocates the load, while the load balancing modules 406 for the auxiliary sensing microsystem would contain the "servant" modules that carry out the decisions of the "master" routine. However, a variety of other strategies and relational architectures, including more democratic methods of load balancing decision making, are also within the scope of the present teachings.

For one embodiment, the power management and availability detection module 404 is configured to (a) estimate a maximum marginal power beyond the required core operations power that can be consumed by the sensing microsystem without introducing unacceptable error into thermal readings acquired by its temperature sensor, and (b) limit the determined amount of electrical power available to shared computing module 408 to that maximum marginal power if it is less than the difference between the total available power and the required core operations power.

Any of a variety of different measurements, metrics, estimations, or expressions can be used to characterize power availability without departing from the scope of the present teachings. For one embodiment, the determined amount of "spare" electrical power available is expressed as an analog value in physical units representative of an electrical power and/or electrical energy level. For another embodiment, determined amount of "spare" electrical power available is expressed as a logical value representative of one of a predetermined plurality of categories generally characteristic of an electrical power availability. By way of example, in one embodiment the amount of "spare" electrical power can be a simple binary YES or NO, or AVAILABLE or NOT AVAILABLE. In other embodiments the amount can be expressed on a three-way logical scale, such as HIGH AVAILABILITY, LIMITED AVAILABILITY, and NO AVAILABILITY. In still other embodiments the amount of "spare" power can be expressed on an N-way logical scale, e.g., a digit between 0 and N−1 where 0 represents no availability and N−1 represents a maximum availability.

Figure 5:
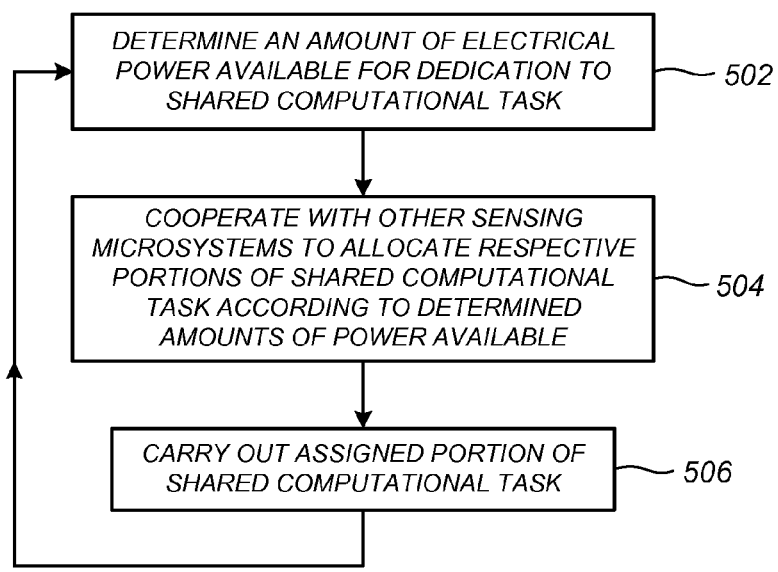
FIG. 5 illustrates shared computational load distribution in a climate control system having plural sensing microsystems according to an embodiment.

FIG. 5 illustrates shared computational load distribution in a climate control system having plural sensing microsystems, such as the sensing microsystem 100 of FIG. 4, according to an embodiment. At step 502, at each sensing microsystem, an amount of electrical power available for dedication to the shared computational task is determined. At step 504, each sensing microsystem cooperates with all other sensing microsystems to allocate thereamong respective portions of the shared computational task according to the amount of electrical power determined to be available for dedication thereto at each respective sensing microsystem. At step 506, each sensing microsystem carries out its respective portion of the shared computational task.

For one embodiment, the shared computational task is apportioned such that each of the sensing microsystems having a greater amount of "spare" electrical power is assigned a heavier associated computational load than each of the sensing microsystems having a lesser amount of "spare" electrical power available. For another embodiment, the overall computational load is allocated to each sensing microsystem in percentagewise proportion to the percentage of the overall amount of "spare" electrical power available thereat. For example, if there are two sensing microsystems including a first sensing microsystem having 75% of the overall available "spare" electrical power and a second sensing microsystem having 25%, then the shared computational load is split 75/25 between those sensing microsystems.

For other embodiments in which spare power availability is expressed as a logical value, such as YES or NO, the computational load distribution can be based on an even division among the YES sensing microsystems. For example, if there are three sensing microsystems including a first sensing microsystem having a "spare" electrical power of NO, and second and third sensing microsystems each having a "spare" electrical power of YES, then the shared computational load can be split 50/50 between the second and third sensing microsystems.

Figure 6:
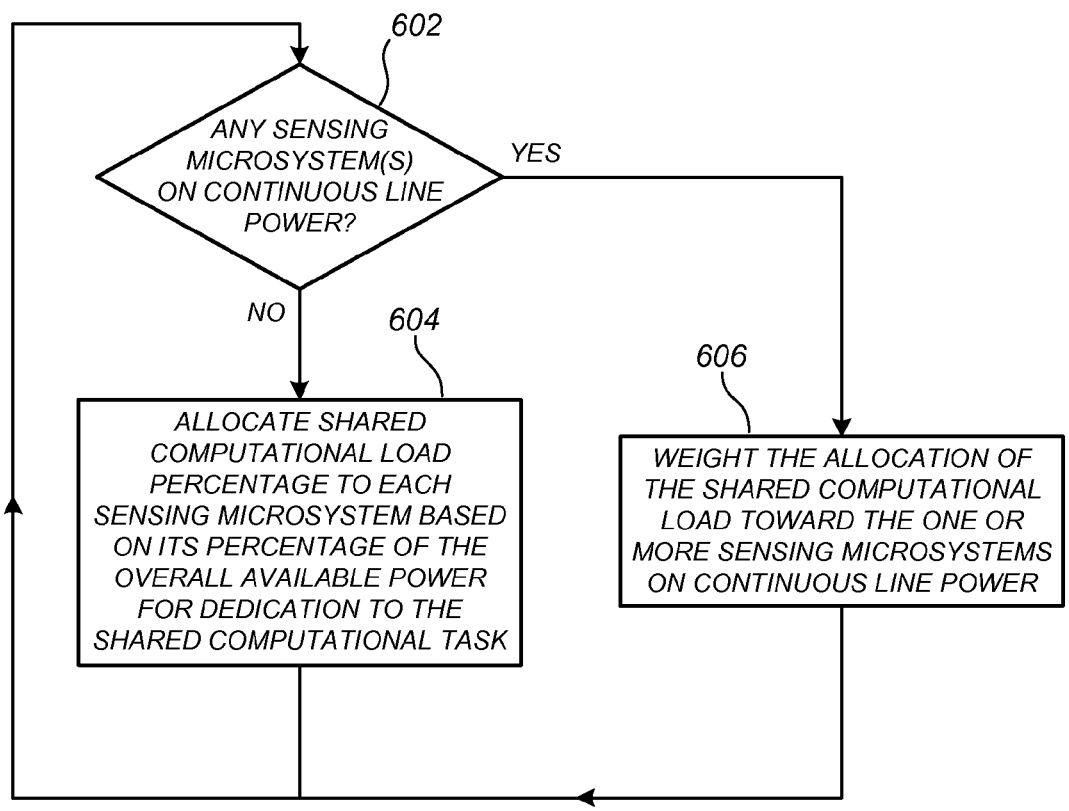
FIG. 6 illustrates shared computational load distribution in a climate control system having plural sensing microsystems according to an embodiment.

FIG. 6 illustrates shared computational load distribution in a climate control system having plural sensing microsystems according to an embodiment. At step 602, it is determined whether any of the sensing microsystems are connected to continuous line power (such as the sensing microsystem 100' of FIG. 3B), and if so, then the allocation of the shared computational load is weighted toward those sensing microsystems at step 606. In one example, all or substantially all of the shared computational load is allocated to the sensing microsystem(s) that are connected to continuous line power. If none of the sensing microsystems are connected to continuous line power, then step 604 is carried out in which the shared computational load is allocated pro rata to each sensing microsystem in percentagewise proportion to its share of the overall amount of "spare" electrical power available.

Thus provided according to one or more embodiments is an ability for the multiple sensing microsystems to judiciously share computing tasks among them in an optimal manner based on power availability and/or circuitry heating criteria. Many of the advanced sensing, prediction, and control algorithms provided with the sensing microsystems are relatively complex and computationally intensive, and can result in high power usage and/or device heating if carried out unthrottled. For one embodiment, the intensive computations are automatically distributed such that a majority (or plurality) of them are carried out on a subset of the sensing microsystems known to have the best power source(s) available at that time, and/or to have known to have the highest amount of stored battery power available. Thus, for example, because it is generally preferable for each primary sensing microsystem not to require household AC power for simplicity of installation as well as for equipment safety concerns, primary sensing microsystems will often be powered by energy harvesting from one or more of the 24 VAC call relay power signals if there is no common (C) wire provided by the HVAC system, and therefore may only have a limited amount of extra power available for carrying out intensive computations. In contrast, a typical auxiliary sensing microsystem may be a nightstand unit (e.g. docking station 205 in FIG. 2A, supra) that can be plugged in as easily as a clock radio. In such cases, much of the computational load can be assigned to the auxiliary sensing microsystem so that power is preserved in the primary sensing microsystem. In another embodiment, the speed of the intensive data computations carried out by the auxiliary sensing microsystem (or, more generally, any sensing microsystem unit to which the heavier computing load is assigned) can be automatically throttled using known techniques to avoid excessive device heating, such that temperature sensing errors in that unit are avoided. In yet another embodiment, the temperature sensing functionality of the sensing microsystem to which the heavier computing load is assigned can be temporarily suspended for an interval that includes the duration of the computing time, such that no erroneous control decisions are made if substantial circuitry heating does occur.

Whereas many alterations and modifications of the present invention will no doubt become apparent to a person of ordinary skill in the art after having read the foregoing description, it is to be understood that the particular embodiments shown and described by way of illustration are in no way intended to be considered limiting. By way of example, although the each of the distributed microsystems in one or more embodiments described above includes a temperature sensor, in other embodiments one or more of the distributed microsystems may omit a temperature sensor while having one or more other types of sensors (e.g., humidity only, occupancy detector only) that are useful in achieving optimal climate control, and/or that are useful in achieving a particular type of climate control.

By way of further example, according to another embodiment there is provided a method in which it is determined whether data communications can be established, or have been established, between one or more of the plurality of lightweight sensing microsystems and an external "heavyweight" node, such as a laptop computer, desktop computer, or other network-attached computing device that does not have a climate sensor or is otherwise normally dedicated to a purpose unrelated to climate control of that enclosure, and that has a relatively high computing capacity and an at least temporary availability to assist in the shared computational load. If such heavyweight node is available, some or all of the shared computational load is offloaded to that external heavyweight node by preparation of a self-contained package of executable code and source data, and transmission of the self-contained package to the external heavyweight node.

By way of further example, it is to be appreciated that the time intervals for which any particular shared computing task allocation is effective can range from relatively long intervals (e.g., where the task assignments are rebalanced once every several minutes to once every several hours based on changed conditions), to very short intervals (e.g., where the task assignments are rebalanced once every few seconds or less based on changed conditions) without departing from the scope of the embodiments. Likewise, the time intervals for rebalancing can be interrupted for various reasons without departing from the scope of the embodiments. Thus, for example, if the network of sensing microsystems is sharing a large simulation load equally, but then a user walks up to one of the sensing microsystems and begins interacting with that unit, the determined amount of "spare" power for that sensing microsystem can be instantly set to zero and the load rebalanced over the other available sensing microsystems. As another example, if the network of sensing microsystems is sharing a large simulation load, but then a user walks up to one of the sensing microsystems and begins interacting with that unit, the determined amount of "spare" power for all sensing microsystem can be instantly set to zero, thus effectively suspending the shared computational task, until the user has walked away, whereupon the shared computational task can be resumed.

By way of even further example, while computational load balancing among a plurality of smart, lightweight (e.g., low power) sensing microsystems according to respective spare power availability at those sensing microsystems has been found to be particularly advantageous for use in achieving practical, appealing, flexible, scalable, and efficient control of one or more HVAC systems in a climate control system according to one or more of the above-described embodiments, it is to be appreciated that the scope of the present teachings is not so limited. Rather, computational load balancing among a plurality of smart, lightweight (e.g., low power) sensing microsystems for control of one or more HVAC systems in a climate control system can be based on any of a variety of other criteria, either as adjunct criteria together with the spare power availability criterion, or as alternative stand-alone criteria, without departing from the scope of the present teachings. Such other criteria upon which the computational load balancing can be based on factors including, but not limited to: the type of microprocessor included in each sensing microsystem; the type of sensor included in each sensing microsystem; the location at which each sensing microsystem is installed within or outside the enclosure; the amount and type of core functionalities for which each respective sensing microsystem is responsible; and the amount and type of immediate non-shared-task related inputs and/or outputs being processed and/or provided by that sensing microsystem at a physical user interface thereof and/or by wireless communication therewith. Therefore, reference to the details of the embodiments are not intended to limit their scope.

In some embodiments, a non-transitory computer readable medium tangibly embodying one or more sequences of instructions is presented. Execution of the one or more sequences of instructions by a plurality of processors contained in a respective plurality of wirelessly communicating sensing microsystems of a distributed climate control system may cause the plurality of sensing microsystems to cooperatively control an HVAC unit based at least in part on temperature readings acquired by at least one temperature sensor located in at least one of the plurality of sensing microsystems. The one or more sequences of instructions may cause the plurality of processors to carry out at least one shared computational task associated with said cooperative control of the HVAC unit, which may include at each sensing microsystem, determining an amount of heat generated by the sensing microsystem as a result of the sensing microsystem performing one or more data computations associated with the at least one shared computational task; and allocating among the sensing microsystems respective portions of the at least one shared computational task according to the amount of heat determined to be generated by each said respective sensing microsystem.

What is claimed:

1. A system for controlling a home environment, comprising:
    a plurality of wirelessly communicating sensing microsystems, each wirelessly communicating sensing microsystem of the plurality of wireless communicating sensing microsystems comprising at least one sensor selected from the group consisting of:
        a temperature sensor,
        a motion sensor, and
        a light sensor; wherein:
            the plurality of wirelessly communicating sensing microsystems are configured to jointly carry out a shared computational task for controlling the home environment;
            each wirelessly communicating sensing microsystem comprises a management circuit configured to perform at least one computation selected from the group consisting of:
                computation of an amount of electrical power available for dedication to the shared computational task, and
                computation of a heating effect due to heat generated in performing one or more data computations associated with the shared computational task; and
            the shared computational task is apportioned among the plurality of wirelessly communicating sensing microsystems based on at least one computation selected from the group consisting of:

the amount of electrical power at each wirelessly communicating sensing microsystem of the plurality of wirelessly communicating sensing microsystems determined to be available for dedication to performing the shared computational task, and the heating effect on each said wirelessly communicating sensing microsystem due to heat generated by said respective wirelessly communicating sensing microsystem in performing the one or more data computations associated with the shared computational task.

2. The system for controlling the home environment of claim 1, wherein at least one wirelessly communicating sensing microsystem of the plurality of wirelessly communicating sensing microsystems comprises:

a thermostat coupled to a heating ventilation and air conditioning (HVAC) system, wherein controlling the home environment comprises controlling the HVAC system.

3. The system for controlling the home environment of claim 1, wherein at least one of the wirelessly communicating sensing microsystems of the plurality of wirelessly communicating sensing microsystems is configured to:

perform intruder detection, wherein controlling the home environment comprises providing an intruder alert upon the detection of an intruder.

4. The system for controlling the home environment of claim 1, wherein the plurality of wirelessly communicating sensing microsystems comprises:

a primary wirelessly communicating sensing microsystem, configured to apportion the shared computational task among the plurality of wirelessly communicating sensing microsystems; and one or more servant wirelessly communicating sensing microsystems, each one or more servant wirelessly communicating sensing microsystems configured to perform a portion of the shared computational task assigned by the primary wirelessly communicating sensing microsystem.

5. The system for controlling the home environment of claim 4, wherein the one or more servant wirelessly communicating sensing microsystems are configured to transmit a binary indication to the primary wirelessly communicating sensing microsystem, the binary indication indicating whether the servant wirelessly communicating sensing microsystems is available for processing a portion of the shared computational task.

6. The system for controlling the home environment of claim 1, wherein the management circuit is configured to perform the computation of the amount of electrical power available for dedication to the shared computational task, and the computation of the amount of electrical power available for dedication to the shared computation task comprises:

determining a first amount of electrical power available to the wirelessly communicating sensing microsystem of the management circuit;

determining a second amount of electrical power required for one or more core operations of the wirelessly communicating sensing microsystem, wherein the one or more core operations comprise wireless communication operations; and determining the amount of electrical power that can be dedicated to the shared computing task based on a difference between the first amount of electrical power and the second amount of electrical power.

7. The system for controlling the home environment of claim 1, wherein a wirelessly communicating sensing microsystem of the plurality of wirelessly communicating sensing microsystems is configured to determine whether continuous line power is electrically connected with the wirelessly communicating sensing microsystem.

8. The system for controlling the home environment of claim 7, wherein distribution of the shared computational task for controlling the home environment among the plurality of wirelessly communicating sensing microsystems is weighted based on the wirelessly communicating sensing microsystems of the plurality of wirelessly communicating sensing microsystems being electrically connected with the continuous line power.

9. The system for controlling the home environment of claim 7, wherein the wirelessly communicating sensing microsystem of the plurality of wirelessly communicating sensing microsystems derives the continuous line power from a 24 V alternating current (AC) relay of an HVAC system.

10. A method for controlling a home environment, comprising:

determining, by each wirelessly communicating sensing microsystem of a plurality of wirelessly communicating sensing microsystems, an amount of electrical power of the wirelessly communicating sensing microsystem available for dedication to a shared computational task for controlling the home environment, wherein each wirelessly communicating sensing microsystem of the plurality of wireless communicating sensing microsystems comprising at least one sensor selected from the group consisting of:
a temperature sensor,
a motion sensor, and
a light sensor;

allocating, among the plurality of wireless communicating sensing microsystems, the shared computational task for controlling the home environment based on determining the amount of electrical power available for dedication to the shared computation task by each wirelessly communicating sensing microsystem of a plurality of wirelessly communicating sensing microsystems; and computing, by one or more wirelessly communicating sensing microsystems of the plurality of wirelessly communicating sensing microsystems, the shared computational task, wherein each of the one or more wirelessly communicating sensing microsystems computes a portion of the shared computational task.

11. The method for controlling the home environment of claim 10, further comprising:

controlling, by a wireless communicating sensing microsystem of the plurality of wireless communicating sensing microsystems, the home environment based on the computed shared computational task.

12. The method for controlling the home environment of claim 11, wherein controlling the home environment comprises:

controlling, by the wireless communicating sensing microsystem, a heating ventilation and air conditioning (HVAC) system based on the computed shared computational task, wherein the wireless communicating sensing microsystem is a thermostat.

13. The method for controlling the home environment of claim 10, further comprising:

performing, by a wireless communicating sensing microsystem of the plurality of wireless communicating sensing microsystem, intruder detection, wherein controlling the home environment comprises providing an intruder alert upon the detection of an intruder.

14. The method for controlling the home environment of claim 10, further comprising:
transmitting, by one or more of wirelessly communicating sensing microsystems of the plurality of wirelessly communicating sensing microsystems, a binary indication that indicates whether the respective wirelessly communicating sensing microsystem is available for processing a portion of the shared computational task.

15. The method for controlling the home environment of claim 10, wherein determining, by each wirelessly communicating sensing microsystem of the plurality of wirelessly communicating sensing microsystems, the amount of electrical power available for dedication to the shared computational task for controlling the home environment comprises:
determining a first amount of electrical power available to the wirelessly communicating sensing microsystem;
determining a second amount of electrical power required for one or more core operations of the wirelessly communicating sensing microsystem, wherein the one or more core operations comprise wireless communication operations; and
determining the amount of electrical power that can be dedicated to the shared computing task based on a difference between the first amount of electrical power and the second amount of electrical power.

16. The method for controlling the home environment of claim 10, further comprising:
determining, by a wirelessly communicating sensing microsystem of the plurality of wirelessly communicating sensing microsystems, that continuous line power is electrically connected with the wirelessly communicating sensing microsystem.

17. The method for controlling the home environment of claim 16, wherein allocating the shared computational task comprises:
weighting distribution of the shared computational task for controlling the home environment among the plurality of wirelessly communicating sensing microsystems based on the wirelessly communicating sensing microsystems of the plurality of wirelessly communicating sensing microsystems being electrically connected with the continuous line power.

18. The method for controlling the home environment of claim 16, further comprising:
receiving, by the wirelessly communicating sensing microsystem of the plurality of wirelessly communicating sensing microsystems, the continuous line power from a 24 V alternating current (AC) relay of an HVAC system.

19. A system for controlling a home environment, comprising:
means for determining an amount of electrical power available, at each sensing microsystem of a plurality of sensing microsystems, for dedication by each sensing microsystem to a shared computational task for controlling the home environment, wherein each sensing microsystem of the plurality of sensing microsystems comprises at least one sensing means selected from the group consisting of:
means for temperature sensing,
means for motion sensing, and
means for light sensing;
means for allocating, among the plurality of sensing microsystems, the shared computational task for controlling the home environment based on the means for determining the amount of electrical power available for dedication to the shared computation task; and
means for computing the shared computational task, wherein each sensing microsystem of the one or more sensing microsystems computes a portion of the shared computational task.

20. The system for controlling the home environment of claim 19, further comprising:
means for performing intruder detection, wherein controlling the home environment comprises providing an intruder alert upon the detection of an intruder.

* * * * *